US006344146B1

(12) United States Patent
Moorehead et al.

(10) Patent No.: US 6,344,146 B1
(45) Date of Patent: Feb. 5, 2002

(54) PORTABLE WATER PURIFICATION DEVICE

(75) Inventors: John S. Moorehead, Westerville; Thomas A. Pettenski, Columbus; John F. Searle, Millersport, all of OH (US); Eric J. Larson, Saint George, UT (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/456,663

(22) Filed: Dec. 9, 1999

Related U.S. Application Data
(60) Provisional application No. 60/111,918, filed on Dec. 11, 1998.

(51) Int. Cl.[7] .................................................. C02F 1/28
(52) U.S. Cl. ........................ 210/668; 210/694; 210/136; 210/203; 210/232; 210/238; 210/244; 210/256; 210/257.1; 210/258; 210/266; 210/282; 210/284; 210/315; 210/416.3
(58) Field of Search ................................. 210/663, 668, 210/669, 688, 694, 109, 117, 136, 192, 203, 209, 232, 238, 244, 256, 257.1, 258, 266, 282, 284, 290, 315, 416.3

(56) References Cited

U.S. PATENT DOCUMENTS

| 703,654 A | * | 7/1902 | Hall ............................ 222/189 |
| 2,566,371 A | * | 9/1951 | Quinn ...................... 210/416.3 |
| 2,670,081 A | * | 2/1954 | Quinn ......................... 210/120 |
| 4,389,311 A | | 6/1983 | La Freniere |
| 4,540,489 A | * | 9/1985 | Barnard ....................... 210/287 |
| 4,714,550 A | * | 12/1987 | Malson et al. ............... 210/244 |
| 5,167,819 A | * | 12/1992 | Iana et al. ................... 210/474 |
| 5,273,650 A | * | 12/1993 | Vermes et al. .............. 210/264 |
| 5,534,145 A | * | 7/1996 | Platter et al. ................. 210/90 |
| 5,558,762 A | | 9/1996 | Fife et al. |
| 5,562,824 A | * | 10/1996 | Magnusson ................. 210/266 |
| 5,569,374 A | * | 10/1996 | Williams ..................... 210/136 |
| 5,643,444 A | * | 7/1997 | Garrigues et al. ........... 210/136 |
| 5,681,475 A | | 10/1997 | Lamensdorf et al. |
| 5,733,448 A | * | 3/1998 | Kaura .......................... 210/238 |
| 5,928,506 A | * | 7/1999 | Bae .............................. 210/94 |
| 6,010,626 A | * | 1/2000 | D'Agostino ................. 210/238 |
| 6,136,188 A | * | 10/2000 | Rajan et al. ................. 210/244 |

FOREIGN PATENT DOCUMENTS

| EP | 0 402 661 A1 | 12/1990 |
| GB | 1023335 | 3/1966 |
| GB | 1 436 111 | 5/1976 |
| GB | 2 207 367 A | 2/1989 |

OTHER PUBLICATIONS

Katadyn USA Inc., Scottsdale, Arizona, The Drinking Water Solution, Brochure.
Sweetwater, Longmont, CO, "Microfilters & Purifiers", Brochure.
Sweetwater Inc., "The Guardian, Micro–Filtration", Brochure.
Adventure Gear, Fayetteville, GA, "Water Treatment", Website Printout, http://www.ewalker.com/adgear/pur.html.
Sweetwater Inc., "Sweetwater Product Information", Website Printout, http://www.sweet–h20.com/products.html.

(List continued on next page.)

Primary Examiner—Peter A. Hruskoci
(74) Attorney, Agent, or Firm—William B. Richards; Courtney J. Miller

(57) ABSTRACT

A portable, self-contained, fully integrated water purification device which includes a receptacle modified to accommodate a filtration assembly for purifying water, and to store water following purification. The receptacle provides separate openings for water intake, and water outflow. The filtration assembly includes a pump and a multistage filter cartridge. Pump action draws water into the water purification device and forces the water through the multistage filter and into the receptacle. Purified water may be stored in the receptacle until consumption.

44 Claims, 6 Drawing Sheets-

OTHER PUBLICATIONS

B&A Products, "Water Filters", Website Printout http://www.baproducts.com/filters.htm/.

Adventure Gear, Fayetteville, GA, "Containers Adventure Gear" Website Printout, http://www.ewalker.com/adgear/contain.htm/.

Campmor, "Water Filters/Purifiers", Website Printout, http://www.campmor.com/water.filters/pur.filters.html.

Dewey Research Center, "Water Purifiers", Website Printout, http://www.4drc.com/water2.html.

General Ecology, Inc., "Portable Water Purification Systems", Website Printout, http://www.general–ecology.com/portuni.html.

Mountain Safety Research Inc., "Water Works II Ceramic Filter", Website Printout, http://www.mrscorp.com/msr/waterwrk.html.

REI, "PUR Scott Purifier", Website Printout, http://www.rei.com/shopping/stores3/.

Secure Future, "Water & Water Purification", Website Printout, http://www.securefuture.com/water.htm/.

U.S. Cavalry, Canteen Filtration System:, Catalogue, p. 6.

"Combi Filter", Catalogue, p. 77.

Pentapure, "The Spring Water Filtration System", Website Printout, http://www.pentapure.com/spring.htm/.

Johnson Environment Systems, Alexandria, VA "Kleen Kanteen" Website Printout, http://www.home.netcom.com/owensva/.html.

\* cited by examiner

PORTABLE WATER PURIFICATION DEVICE

This application claims the benefit of U.S. Provisional Application No. 60/111,918, filed Dec. 11, 1998, entitled "Integrated Water Filtration Device and Water Receptacle," the disclosure of which is incorporated as if fully rewritten herein.

This invention was made with government support under Contract No. SPO900-94-D-0002/DO 0109/TAT 197 awarded by the Department of Defense/Navy. The United States Government has certain rights in this invention.

FIELD OF THE INVENTION

This invention relates to portable water purifiers, their method of making and their method of use.

BACKGROUND OF THE INVENTION

Converting water containing chemical and/or biological contaminants into potable water is a challenge often encountered by individuals such as hikers, campers, and soldiers, who do not have access to dean drinking water when in the field. Extended periods of outdoor travel on foot in areas where there is no known clean water source necessitates an effective water purification system that is lightweight, self-contained, and can easily be carried on the person. Furthermore, the ability of a water purification system to remove both chemical and biological contaminants may be critical when the only available water source is industrial waste water or water generated by a septic system.

A variety of portable water purification systems are available; however, such systems are often significantly limited in terms of portability and effectiveness. Most commercially available water purification systems typically include a manual pump which, through the use of air pressure, forces water through a column containing a filtration device. Often, the pump and filtration device is separate from and external to a water receptacle; therefore, the user is required to carry the pump and filtration device as well as a suitable receptacle for the purified water. In addition to the issue of portability, the use of air pressure to force contaminated water through a filtration device may greatly decrease the effectiveness of the filtration device. Using a pump that operates by air pressure means may result in the formation of air pockets within the filtration device. Removing common biological contaminants such as Giardia and Cryptosporidia can be particularly problematic if such air pockets form within the filtration system. Air pockets in the filtration device are likely to prevent biological organisms from contacting the filtration material, thereby allowing viable infectious organisms to pass through the filter and into the water that is to be consumed. Thus, there is a need for a water purification system that includes a pump and filtration device that is integrated with a water receptacle. Likewise, there is also a need for a water purification system that utilizes water pressure rather than air pressure to force water through a filtration device.

The filtration devices found within many commercial water purification systems are designed to remove either chemical contaminants such as pesticide residues, or biological contaminants such as those already mentioned. However, many of these systems are not designed to effectively remove both chemical and biological contaminants from a water source. Furthermore, the effectiveness of the filtration devices employed by many commercially available water purification systems can be highly variable due to problems with both the materials used for filtration and with the overall construction of the devices. Thus, there is a need for a water purification system that consistently and effectively removes both chemical and biological contaminants.

Two U.S. patents disclose water filtration systems that are integrated with water receptacles, but each system is subject to significant limitations. U.S. Pat. No. 4,714,550 to Malson-Sharpe discloses a water purifying system designed to be mounted in a conventional canteen. The user must first fill the canteen with contaminated water, and then insert the purifier into the canteen. This system employs a pump that utilizes air pressure to force the contaminated water contained in the canteen body through a filtration resin and eventually into a straw-like conduit from which the user consumes the water. The design of the Malson-Sharpe system has several significant drawbacks. Firstly, filling the body of the canteen with contaminated water provides an environment in which pathogenic microorganisms may incubate and multiply. Thus, if a person does not insert the purifier every time the canteen is used, or does not thoroughly clean the interior of the canteen between uses, that individual runs the serious risk of consuming water containing infectious bacteria or other microorganisms. Secondly, this system utilizes air pressure to pump water through the purifier, which as described above, can result in a marked decrease in the effectiveness of the filtration system. U.S. Pat. No. 5,167,819 to Iana-McCray also employs a filtration device is that is inserted into a canteen filled with contaminated water. This device utilizes suction applied by the user, rather than a manual pump, to draw water through a filter. Again, the use of air pressure to force water through the filter results in the potential reduction of the effectiveness of the filter. Finally, the water purification systems taught by U.S. Pat. Nos. 4,714,550 and 5,167,819 both require the user to consume purified water from an outlet located very close to the inlet for the contaminated water. The proximity of the water inlet to the water outlet may result in the inadvertent or accidental consumption of unfiltered water containing infectious, pathogenic microorganisms or toxic chemicals. Thus, there is a need for a portable water filtration system in which the water inlet and water outlet are separated by a distance sufficient to prevent the accidental ingestion of contaminated water.

BRIEF DESCRIPTION OF THE INVENTION

Accordingly, these and other disadvantages of the prior art are overcome by the present invention, which provides a water purification apparatus comprising an integrated filtration device and sealable receptacle for storing purified water. This invention converts undrinkable water into potable water, is fully self-contained, removes chemical and biological contaminants, and is small enough to be conveniently carried into the field by a hiker, camper, or soldier. The present invention further includes a canteen body specially modified to receive a well in which a filtration assembly is secured. The filtration assembly includes a pump and a multistage filter cartridge. The multistage filter cartridge is removable and replaceable and includes a two-stage porous material and purification resin filter, or a three-stage porous material, purification resin, and carbon filter. The pump of the filtration device utilizes water pressure, rather than air pressure, to force contaminated water through the multistage filter cartridge. Utilization of water pressure eliminates, or greatly reduces, the formation of air pockets within the multistage filter cartridge, thereby mitigating the risk of decreased filter effectiveness. The clean water receptacle of this invention also provides a first opening for water intake and a second opening for water outflow so that the user need not drink from the same opening through which contaminated water entered the body of the canteen. Additionally, the canteen body of this invention provides a sealable receptacle in which a volume of water can be stored following purification, thereby eliminating the need to ever introduce chemically or biologically contaminated water into the body of the canteen where it could be accidentally or inadvertently consumed by the user.

Further objects and advantages of the present invention will become apparent from a consideration of the drawings and subsequent detailed description of this invention.

BRIEF DESCRIPTION OF THE DRAWINGS

FIG. 4a illustrates the piston in the depressed position within the cylinder, and FIG. 4b illustrates the piston in the retracted position within the cylinder.

Figure 1:
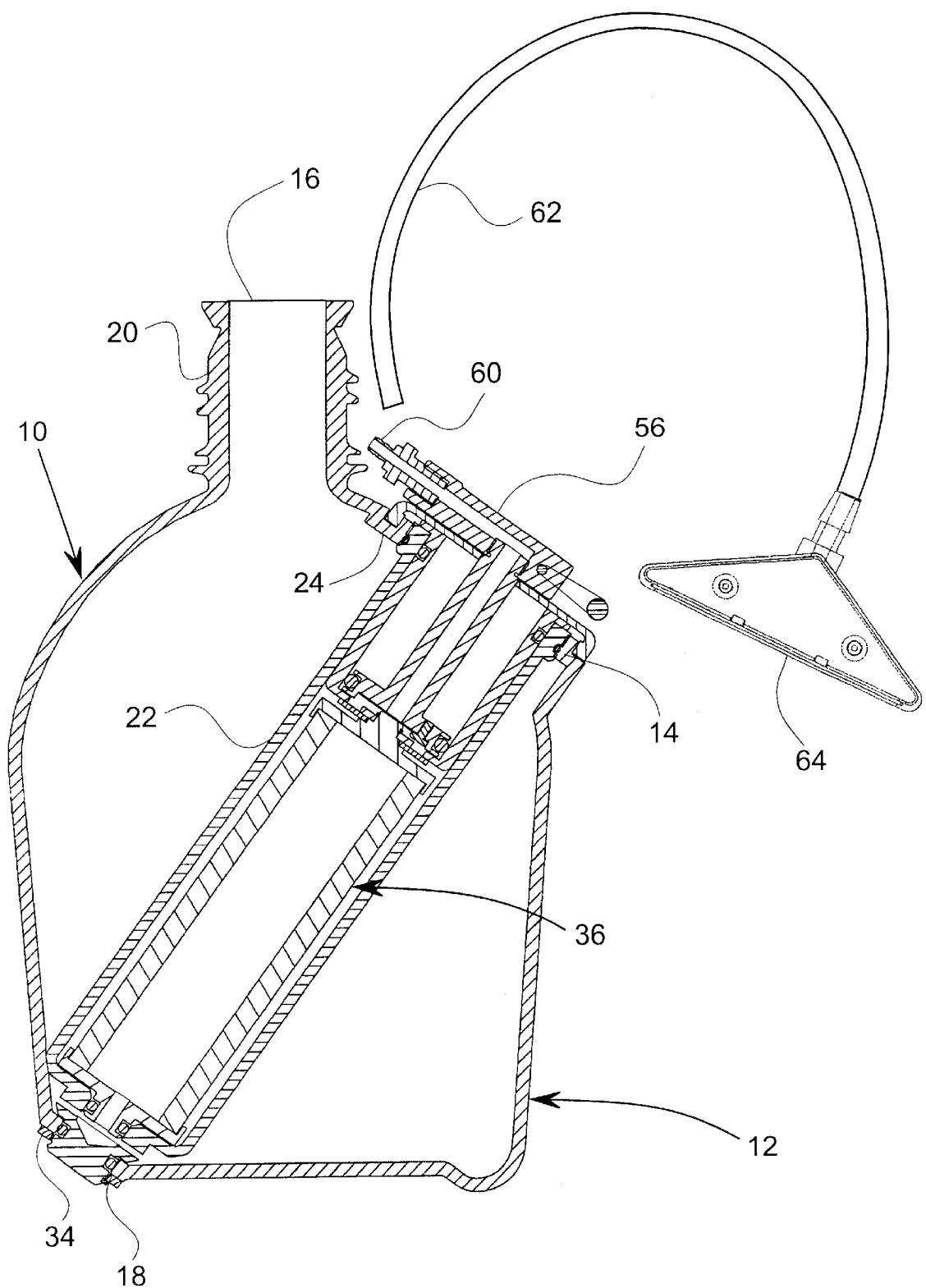
FIG. 1 is a cross-sectional view of the water purification apparatus constructed according to the teachings of the present invention. In this illustration, the water purification apparatus is configured as a military canteen.

REFERENCE NUMERALS 10 water purification device
12 receptacle
14 side opening
16 top opening
18 bottom opening
20 stem
22 well
24 protruding lip of well
26 open end of well
28 closed end of well
30 plurality of channels
32 boss
34 retaining ring
35 annular space
36 filtration assembly
38 pump
40 cylinder
42 cylinder cap
44 cylinder cavity
46 cylinder flapper valve
48 plurality of apertures
50 piston
52 piston channel
54 piston flapper valve
56 handle body
58 D-ring handle
60 tube fitting
62 conduit
64 prefilter
66 multistage filter cartridge
68 ceramic filter element
70 purification resin filter element
72 carbon element filter element
74 blind filter cap
76 flow-through filter cap
78 groove
80 end-cap assembly
82 end-cap
84 valve seat
86 spring-loaded check valve

DETAILED DESCRIPTION OF THE INVENTION AND BEST MODE

Figures 2, 3:
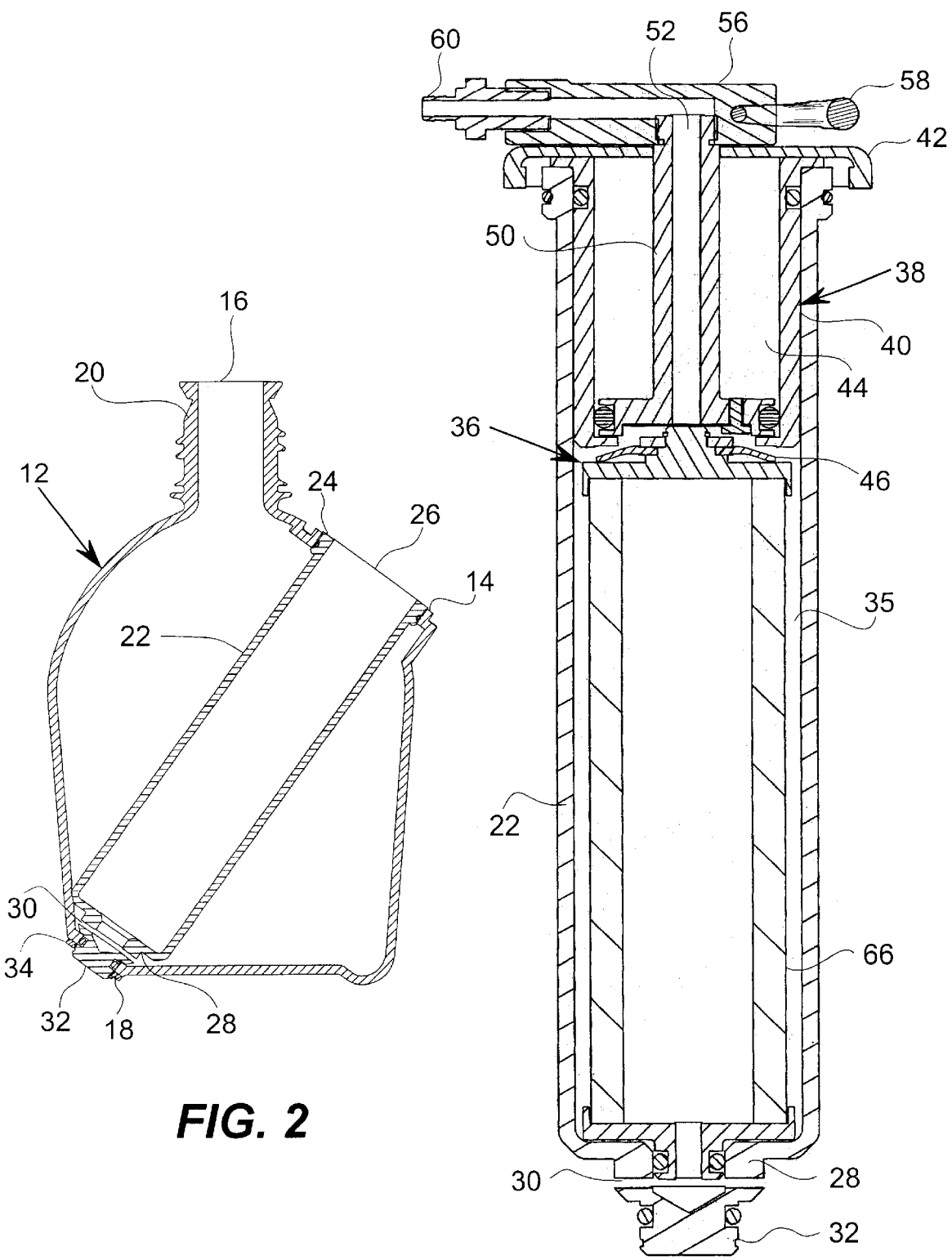
FIG. 2 is a cross-sectional view of the modified body of a military canteen as show in FIG. 1, and is illustrative of the placement of the well within the canteen body and the separation of openings for water intake and outflow.
FIG. 3 is a cross-sectional view of the well and filtration device assembly that is secured within the canteen body as shown in FIG. 1.

As best shown in FIGS. 1 and 2, a water purification device 10 according to a preferred embodiment of the present invention comprises a canteen-shaped receptacle 12 which is hollow and modified to provide separate openings for fluid intake and outflow. A side opening 14 permits water to enter water purification device 10, and a top opening 16 permits the outflow of purified water from water purification device 10. Top opening 16 includes a hollow stem 20 which threadably receives a cap, which when tightened onto stem 20 seals top opening 16. Side opening 14 also receives well 22, and filtration assembly 36 resides in well 22. FIGS. 1 and 3 show filtration assembly 36 which further comprises a pump 38, a multistage filter cartridge 66, and a detachable conduit 62. Detachable conduit 62 further includes a length of tubing, and a detachable prefilter 64.

As best illustrated in FIGS. 2 and 3, well 22 comprises an open end 26, a closed end 28, a protruding lip 24, a plurality of channels 30 in fluid communication with the interior of receptacle 12, and a boss 32. Well 22 is positioned within receptacle 12, and is secured against receptacle 12 by extending boss 32 through bottom opening 18 and securing boss 32 against receptacle 12 with retaining ring 34. An o-ring encircling boss 32 forms a watertight seal with receptacle 12 at bottom opening 18. Open end 26 extends through side opening 14, and is secured against receptacle 12 by tightening cylinder cap 42 which is threadably received on side opening 14. An o-ring encircling protruding lip 24 forms a watertight seal with receptacle 12 at side opening 14. Filtration assembly 36 is positioned within well 22 and further comprises pump 38 and multistage filter cartridge 66. An annular space 35 exists between the interior wall of well 22 and the exterior of multistage filter cartridge 66.

Figure 4A:
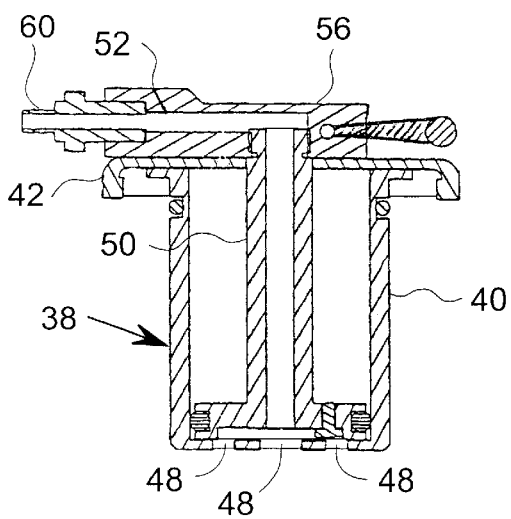
FIGS. 4a and 4b are cross-sectional views of the pump component of the filtration device as shown in FIG. 3.
Figure 4B:
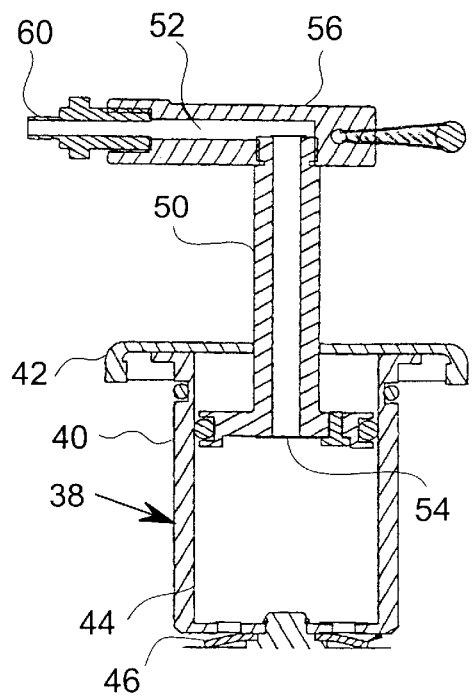

Pump 38, shown in FIGS. 4a and 4b as a manual pump, comprises a cylinder 40, a piston 50 positioned within cylinder 40, and a handle body 56 attached to the top of piston 50. Cylinder 40 further comprises cylinder cap 42, cylinder cavity 44 within cylinder 40, cylinder flapper valve 46 attached to the bottom exterior of cylinder 40, and plurality of apertures 48 in the bottom of cylinder 40. As shown in FIG. 1, cylinder cap 42 is threadably received on side opening 14, thereby securing filtration assembly 36 within well 22. As best illustrated in FIGS. 4a and 4b, piston 50 is positioned within cylinder 40 and includes a piston channel 52 extending longitudinally through handle body 56 and piston 50, and a piston flapper valve 54 attached to the bottom of piston 50. Handle body 56 is attached piston 50 opposite piston flapper valve 54 and includes D-ring handle 58 and tube fitting 60. Tube fitting 60 detachably receives conduit 62. At the end opposite tube fitting 60, conduit 62 detachably receives prefilter 64 which further comprises a metal housing encasing a screen.

Figure 5:
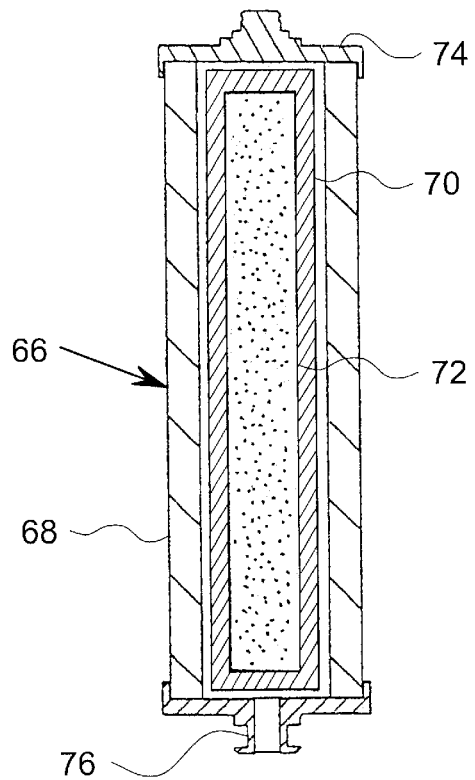
FIG. 5 is a cross-sectional view of the multistage filter cartridge of the filtration device as shown in FIG. 3 wherein the cartridge comprises a ceramic filter element, a resin filter element, and a powdered filter element.

As best illustrated in FIG. 3, pump 38 is coupled in fluid communication with multistage filter cartridge 66. FIG. 5 shows multistage filter cartridge 66, which comprises a ceramic filter element 68, a purification resin filter element 70, and a carbon filter element 72. In a preferred embodiment, ceramic filter element 68 is the first-stage filter and has the general shape of a hollow cylinder. Purification resin filter element 70 is the second-stage filter, also having the general shape of a hollow cylinder, and is positioned within the hollow interior of ceramic filter element 68. Carbon filter element 72 is the third-stage filter and is positioned within the hollow interior of purification resin filter element 70 in the form of a loose powder or loose beads. The filter elements are held together, one inside the other, by a blind filter cap 74 glued to one end of the assembly, and a flow-through filter cap 76 glued to the other end of the assembly. As shown in FIG. 3, an o-ring encircling flow-through filter cap 76 forms a seal with closed end 28 to prevent filtered water from re-entering annular space 35.

Figure 6:
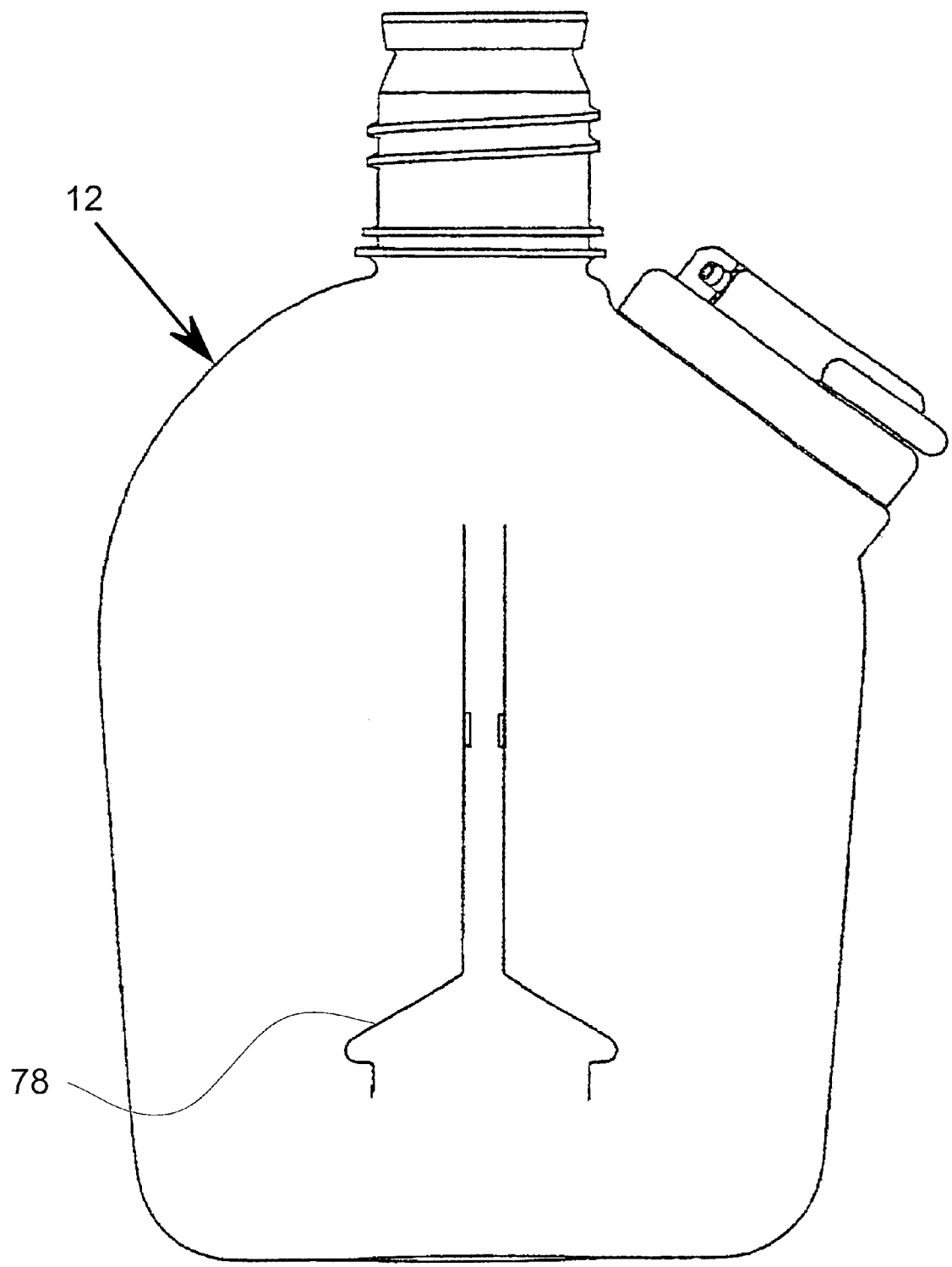
FIG. 6 illustrates an embodiment of the present invention in which the body of the canteen shown in FIG. 1 has been modified by including a groove recessed into the body of the canteen for securing the conduit and prefilter.

FIG. 6 illustrates an embodiment of the present invention in which receptacle 12 has been further modified to include groove 78 which receives and secures conduit 62 and prefilter 64 (shown in FIG. 1) against the body of receptacle 12.

Figure 7:
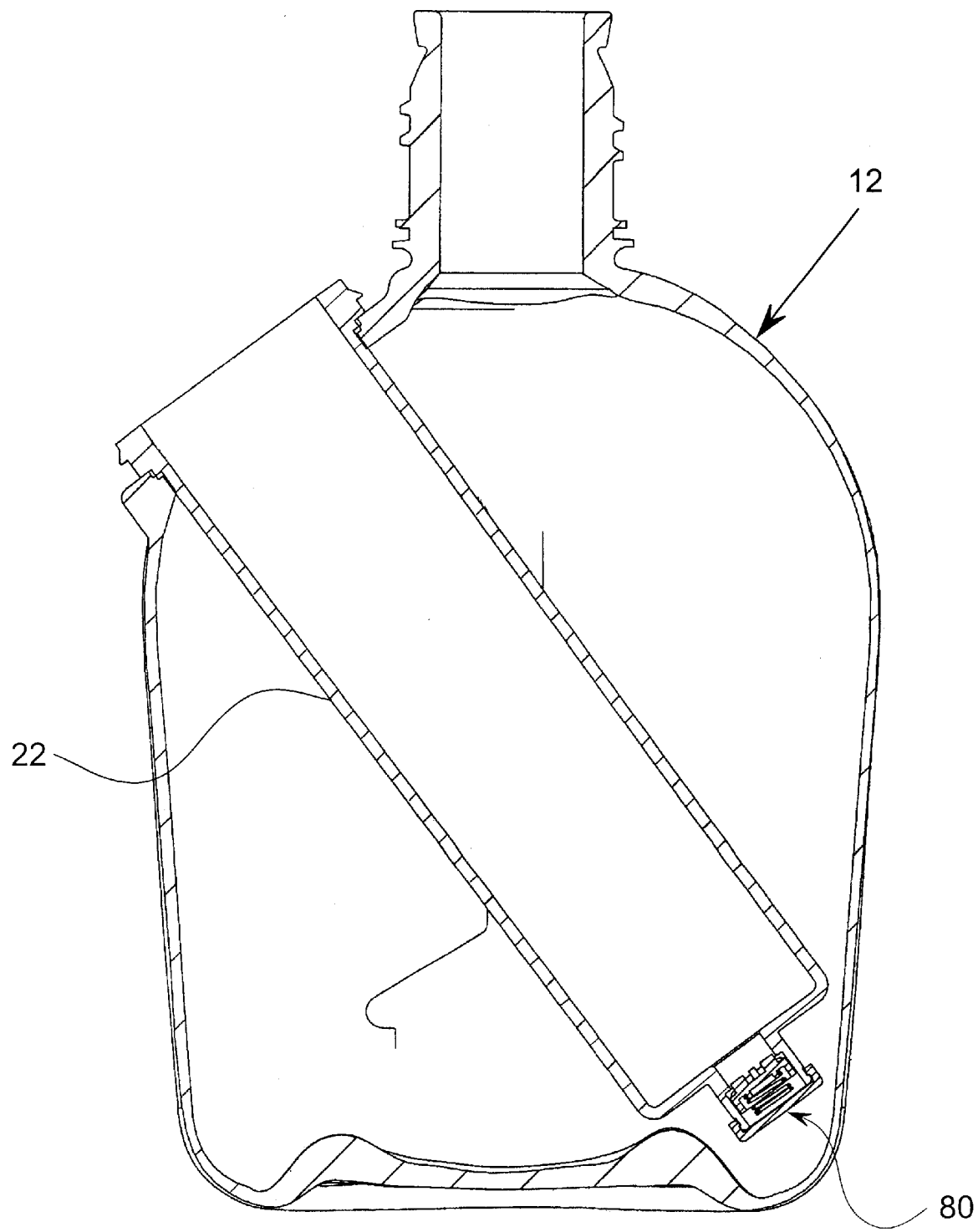
FIG. 7 illustrates an alternate embodiment of the present invention wherein the well does not extend through an opening in the bottom of the canteen as depicted in FIG. 1, but rather is secured only at the side opening.

FIG. 7 illustrates an embodiment of the present invention in which receptacle 12 does not include bottom opening 18 as shown in FIG. 1. Well 22 is secured within receptacle 12 only at side opening 14 and does not exit from the body of receptacle 12 as shown in FIG. 1. In this embodiment, well 22 does not include closed end of well 28 and retaining ring 34 as shown in FIG. 1.

Figure 8:
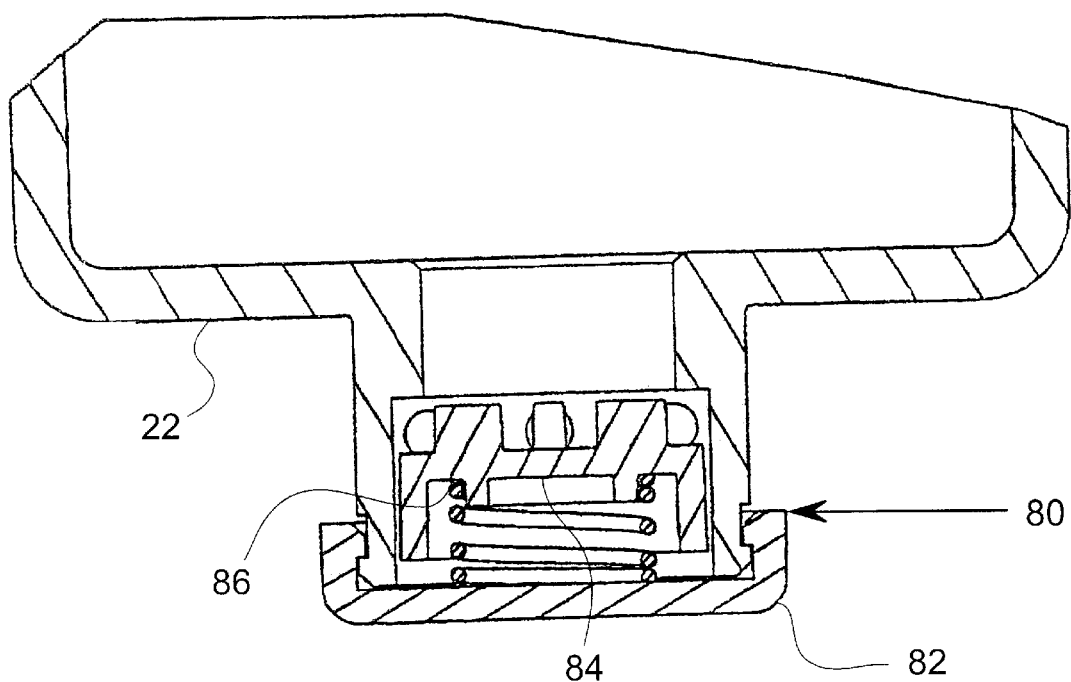
FIG. 8 is a cross-sectional view of the end cap assembly that is secured to the bottom of the well in the embodiment shown in FIG. 7 to prevent the flow of contaminated water from the well into the canteen body when the filtration device is removed from the well.

FIGS. 7 and 8 illustrate an embodiment of the present invention in which closed end of well 28, as shown in FIG. 3 has been replaced with end cap assembly 80. End-cap assembly 80 prevents contaminated water from exiting well 22 through plurality of channels 30 when filtration assembly 36 is not positioned within well 22. End-cap assembly 80 includes valve seat 84, spring-loaded check valve 86, and end-cap 82 which secures end-cap assembly 80 to well 22. When filtration assembly 36 is removed from well 22, spring-loaded check valve 86 moves upward to close plurality of channels 30. When filtration assembly 36 is correctly positioned in well 22, valve seat 84 depresses spring-loaded check valve 86 and plurality of channels 30 is opened thereby allowing water to pass into the body of receptacle 12.

The operation of water purification device 10 may be described as follows. Prefilter 64 is attached to conduit 62, which is in turn attached to tube fitting 60. Prefilter 64 prevents large particulates from entering conduit 62. Prefilter 64 is submersed into a body of contaminated water, and by grasping D-ring handle 58, which is attached to handle body 56, and pulling outward, piston 50 is retracted from cylinder 40. As piston 50 is retracted, cylinder flapper valve 46 closes against the bottom of cylinder 40 to prevent water backflow from annular space 35, water enters conduit 62, piston flapper valve 54 opens, water passes through piston channel 52 and fills cylinder cavity 44. By depressing handle body 56, piston flapper valve 54 closes to prevent water backflow into piston channel 52, cylinder flapper valve 46 opens, water is forced from cylinder cavity 44 through plurality of apertures 48 in the bottom of cylinder 40, and into the annular space 35 between well 22 and multistage filter cartridge 66. From annular space 35 water is then forced first through ceramic filter element 68, secondly through purification resin filter element 70, and finally through carbon filter element 72. Water exits multistage filtration cartridge 66 and passes through plurality of channels 30 into the hollow interior of receptacle 12. Purified water may be stored in receptacle 12 and can be consumed following purification by decanting the water through top opening 16.

The present invention presents many advantages including the following: (1) a fully integrated water filtration device and water receptacle that is entirely self-contained and easily portable; (2) completely distinct and separate openings in the receptacle: a side opening for the intake of water into the filtration device, and top opening for decanting purified water, thereby preventing consumption of clean water from the same opening through which contaminated water entered the canteen; (3) a filtration device and pump that utilizes water pressure, rather than air pressure, thereby maximizing the effectiveness of the filtration device; (4) a multistage filtration cartridge that removes biological and chemical contaminants, and is detachable and replaceable; and (5) the elimination of the need for contaminated water to be introduced into the water receptacle, thus preventing the possible growth of infectious microorganisms in the receptacle's interior, and preventing possible chemical contamination of the receptacle's interior. Additionally, the preferred embodiment, as shown in the Figures, is fully compatible with current military auxiliary equipment including currently used canteen caps, cups and covers.

While the above description contains many specificities, these should not be construed as limitations on the scope of the invention, but rather as exemplification of preferred embodiments thereof. Numerous other variations are possible, and its not intended herein to mention all of the possible equivalent forms or ramifications of this invention. Various changes may be made to the present invention without departing from the scope of the invention, and the following are examples of such changes.

Receptacle 12 may be manufactured from polymer, plastic, aluminum, tin, stainless steel, or other suitable metals. Receptacle 12 can be a variety of shapes and sizes resembling a canteen, including a military canteen, the shape of which is shown in FIGS. 1 and 2. However, the shape, size, and volume of water purification device 10 are not limited to that of a canteen. The integrated purification system of the present invention may be configured to filter and hold much larger volumes of water. For example, in one embodiment, the water purification apparatus filters volumes from about 0.25 liters to greater than 10 liters, and the receptacle is any of a variety of geometrical configurations including, but not limited to, cylindrical, rectangular, and spherical.

The body of receptacle 12, as described in the preferred embodiment, and as best illustrated in FIG. 2 is modified to include top opening 16 for decanting purified water, side opening 14 for accommodating well 22, and bottom opening 18, for securing well 22 against receptacle 12. In an alternate embodiment, bottom opening 18 is absent and the bottom interior of the receptacle is further modified to include a peg or post that well 22 rests upon or is secured to by threading or other means. Another embodiment replaces bottom opening 18 with a collar or a boss on the interior of the receptacle that closed end 28 of the well rests within, or is threaded to, thereby securing well 22 within receptacle 12. Still another embodiment eliminates any opening or modification to the bottom of receptacle 12 whatsoever, with well 22 being secured only at side opening 14.

In the preferred embodiment, well 22 is plastic, but alternatively well 22 may be manufactured from polymer, plastic, metal, or any other suitable material. Conduit 62 may be plastic, rubber, or any other suitable material, and may be about 0.5 to 6 feet in length and have an internal diameter of about 0.125 to 0.5 inches. The materials used in manufacturing the receptacle, well and conduit, as well as the dimensions of these components, will vary according to the overall size, shape, and final configuration of the particular version of the integrated water purification apparatus in question.

Pump 38 is shown in the Figures and is described in the preferred embodiment as a manual pump which forces water into and through filtration assembly 36 by retracting and depressing piston 50 using handle 56. An alternate embodiment of the present invention includes a pump that is operated by a lever, rather than a handle, that retracts and depresses piston 50. In another embodiment the pump is an electric or battery operated pump that requires no manual effort to retract and depress the piston. Another embodiment includes a pump that operates by means of a bulb, an air intake, and a pressure release valve. The user compresses the pressure release valve with one hand and flattens the bulb with the other hand, thereby forcing air from the bulb. The pressure release valve is depressed again, the bulb expands, and water is drawn into the filtration device. Compressing the bulb again forces water through the filtration device. Additional alternate embodiments of this invention utilize peristaltic pumps, diaphragm pumps, and pumps operated by gas pressure, or any other means by which the force required to extract and depress piston 50 may be exerted on piston 50.

In a preferred embodiment of the present invention, detachable and replaceable multistage filtration cartridge 66 removes biological and chemical contaminants and comprises three filter types: porous ceramic, purification resin, and carbon powder or beads. The ceramic filter element 68 removes large particulates and may have a pore diameter of about 0.1 to 0.5 μm. Another embodiment replaces ceramic with porous glass, polymer, plastic, metal or any other suitable porous or sintered material. Purification resin element 70 removes biological contaminants, and in addition to, or in place of resin, an alternate embodiment includes a purification matrix of granulated powder or beads. In one embodiment, the purification resin is one of a class of halogenated resins, specifically iodinated resin. Carbon filter element 72 removes chemical contaminants, and in one embodiment the carbon filter is activated charcoal. In still another embodiment of this invention, the carbon filter is absent, and the filter cartridge is a two-stage ceramic and purification resin cartridge.

We claim:

1. A water purification device, comprising:
   (a) a receptacle for storing purified water;
   (b) a well positioned within said receptacle; and
   (c) a filtration assembly positioned within said well, wherein said receptacle further comprises: a first opening for the admission of unpurified water into said filtration assembly, and a second opening for the outflow of purified water from said receptacle, and wherein said filtration assembly further comprises:
   (1) a filtration device and
   (2) a pump utilizing water pressure in fluid communication with said filtration device for causing unpurified water to traverse said filtration device and enter said receptacle as purified water.

2. The water purification device of claim 1, wherein said well is polymer, plastic, or metal.

3. The water purification device of claim 1, wherein said filtration device is a multistage filter cartridge.

4. The water purification device of claim 3, wherein the multistage filter cartridge further comprises:
   (a) a porous material for removing large-particulates; and
   (b) a material for removing biological contaminants in fluid communication with said porous material.

5. The water purification device of claim 4, further comprising a material for removing chemical contaminants in fluid communication with said material for removing biological contaminants.

6. The water purification device of claim 5, wherein said material for removing chemical contaminants is activated carbon or activated charcoal.

7. The water purification device of claim 4, wherein said porous material is ceramic, glass, plastic, or metal.

8. The water purification device of claim 4, wherein said material for removing biological contaminants is a halogenated resin.

9. The water purification device of claim 8, wherein said halogen is iodine.

10. The water purification device of claim 3, wherein said pump is manually operated.

11. The water purification device of claim 3, wherein said pump is electrically operated.

12. The water purification device of claim 1, wherein said receptacle further comprises a third opening for securing said well to the exterior of said receptacle.

13. The water purification device of claim 12, wherein said third opening is on the bottom of said receptacle at an angle parallel to said first opening.

14. The water purification device of claim 1, wherein said first opening is on either side of said receptacle oriented away from said second opening.

15. The water purification device of claim 1, wherein said second opening is on the top of said receptacle.

16. An apparatus for converting contaminated water into potable water, comprising:
   (a) a water receptacle;
   (b) a well secured within said receptacle; and
   (c) a filtration assembly secured within said well, wherein said receptacle further comprises: a first opening for the admission of unpurified water into said filtration assembly, and a second opening for the outflow of purified water from said receptacle, and wherein said filtration assembly further comprises:
   (1) a pump and
   (2) a filtration device in fluid communication with said pump, wherein said pump utilizes water pressure to cause unpurified water to traverse said filtration device and enter said receptacle as purified water.

17. The apparatus of claim 16, further comprising a conduit attached to said filtration assembly for transporting water into said filtration assembly; and a prefilter attached to the end of said conduit opposite said filtration assembly.

18. The apparatus of claim 16, wherein said receptacle further comprises a hollow, sealable reservoir for storing potable water, said reservoir further comprising a side opening for receiving said well; and a top opening for removing water from said reservoir.

19. The apparatus of claim 16, wherein said well further comprises an end cap assembly for preventing water outflow from said well when said filtration assembly is not positioned in said well.

20. The apparatus of claim 16, wherein said pump is a manual pump further comprising: a hollow cylinder; a piston positioned with said hollow cylinder; and a handle attached to said piston.

21. The apparatus of claim 16, wherein said filtration device further comprises at least one filter for removing biological contaminants.

22. The apparatus of claim 21, wherein said at least one filter for removing biological contaminants is a porous material, wherein said porous material is ceramic, glass, polymer, plastic, or metal.

23. The apparatus of claim 22, wherein said porous material further comprises pores of about 0.1 to 0.5 $\mu$m in size.

24. The apparatus of claim 21, wherein said at least one filter for removing biological contaminants is a purification resin.

25. The apparatus of claim 24, wherein said purification resin is a halogenated resin.

26. The apparatus of claim 25, wherein said halogen is iodine.

27. The apparatus of claim 16, wherein said filtration device further comprises: at least one filter for removing biological contaminants; and at least one filter for removing chemical contaminants.

28. The apparatus of claim 16, wherein said receptacle is in the shape of a canteen.

29. The apparatus of claim 16, wherein said receptacle is in the shape of a military canteen.

30. The apparatus of claim 16, wherein the receptacle is substantially cylindrical, parallelepipoid, or spheroid.

31. The apparatus of claim 16, wherein the receptacle is polymer, plastic, or metal.

32. A portable water purification device, comprising:
   (a) a receptacle for storing purified water, wherein said receptacle further comprises: a first opening for the admission of unpurified water into a filtration device; and a second opening for the outflow of purified water from the receptacle;
   (b) a well secured within said receptacle;
   (c) a filtration assembly secured within said well, wherein said filtration assembly further comprises:
      (1) a pump and
      (2) a multistage filter cartridge in fluid communication with said pump, wherein said pump utilizes water pressure to cause water to traverse said multistage filter cartridge; and
   (d) a conduit attached to said filtration assembly for transporting water into said filtration assembly, wherein said conduit further comprises a prefilter attached to said conduit opposite said filtration assembly.

33. The water purification device of claim 32, wherein said pump further comprises:
   (a) a hollow, sealable cylinder;
   (b) a piston within, and slidably coupled to, said cylinder; and
   (c) a flapper valve interposed between said cylinder and said multistage filter cartridge.

34. The water purification device of claim 33, wherein said cylinder further comprises a cap threadably received on said first opening of the receptacle.

35. The water purification device of claim 33, wherein the piston further comprises:
   (a) a handle body attached to the top of said piston, wherein said handle body further comprises a handle;
   (b) a hollow inner channel passing through the length of said handle body and said piston; and
   (c) a flapper valve attached to the bottom of said piston.

36. The water purification device of claim 35, wherein said handle body further comprises:
   (a) a tube fitting;
   (b) a conduit attached to said tube fitting; and
   (c) a prefilter attached to said conduit opposite said tube fitting, wherein said prefilter further comprises: a housing; and a screen encased within said housing.

37. The water purification device of claim 36, wherein said conduit is polymer, plastic, or rubber.

38. The water purification device of claim 36, wherein said prefilter is polymer, plastic, or metal.

39. The water purification device of claim 32, wherein said multistage filter cartridge further comprises:
   (a) a ceramic filter element; and
   (b) a purification resin element positioned within said ceramic filter element.

40. The water purification device of claim 39, wherein the multistage filtration cartridge further comprises a carbon filter element.

41. The water purification device of claim 40, wherein the multistage filtration cartridge further comprises a cylindrical ceramic filter element having a bore therein extending longitudinally along the entire length of the ceramic element, the purification resin element being contained within the bore of the ceramic element, the carbon filter element being contained within a bore extending longitudinally along the length of the purification resin element, and all elements being held together by end closures secured on both ends of the cartridge.

42. A method of converting contaminated water into potable water, comprising:
   (a) providing a filtration assembly integral with a water receptacle, said filtration assembly comprising a filtration device and a pump, wherein said receptacle further comprises: a first opening for the admission of unpurified water into said filtration assembly, and a second opening for the outflow of purified water from said receptacle, and said filtration device is secured within a well secured within said receptacle;
   (b) pumping water from a contaminated water source into and through said filtration device, whereby water pressure causes said contaminated water to traverse at least one filter element, and pass into said receptacle as potable water; and
   (c) storing said potable water in said receptacle until use.

43. The method of claim 42 wherein said filtration device comprises: a ceramic element, a purification resin element, and carbon filter element.

44. A portable kit for purifying water, comprising:
    (a) a receptacle for storing purified water;
    (b) a well positioned within said receptacle;
    (c) a filtration assembly positioned within said well, wherein said receptacle further comprises: a first opening for the admission of unpurified water into said filtration assembly, and a second opening for the outflow of purified water from said receptacle, and wherein said filtration assembly further comprises:
    (1) a filtration device and
    (2) a pump utilizing water pressure in fluid communication with said filtration device for causing unpurified water to traverse said filtration device and enter said receptacle as purified water.

* * * * *